United States Patent
Ye et al.

(10) Patent No.: US 10,579,901 B2
(45) Date of Patent: Mar. 3, 2020

(54) METHOD, SYSTEM AND APPARATUS FOR COMPARING OBJECTS IN IMAGES

(71) Applicant: CANON KABUSHIKI KAISHA, Tokyo (JP)

(72) Inventors: Getian Ye, Kogarah (AU); Ka Ming Leung, Marsfield (AU)

(73) Assignee: Canon Kabushiki Kaisha, Tokyo (JP)

(*) Notice: Subject to any disclaimer, the term of this patent is extended or adjusted under 35 U.S.C. 154(b) by 93 days.

(21) Appl. No.: 15/832,288

(22) Filed: Dec. 5, 2017

(65) Prior Publication Data
US 2019/0171905 A1 Jun. 6, 2019

(51) Int. Cl.
G06K 9/00 (2006.01)
G06F 16/783 (2019.01)
G06K 9/62 (2006.01)

(52) U.S. Cl.
CPC ........ *G06K 9/6211* (2013.01); *G06F 16/7837* (2019.01); *G06F 16/7854* (2019.01); *G06K 9/00201* (2013.01); *G06K 9/00228* (2013.01); *G06K 9/6282* (2013.01)

(58) Field of Classification Search
None
See application file for complete search history.

(56) References Cited

U.S. PATENT DOCUMENTS

2016/0042251 A1* 2/2016 Cordova-Diba .......... G06T 5/00
382/180

OTHER PUBLICATIONS

Kodirov, Elyor, Xiang, Tao, Fu, Zhenyong, Gong, Shaogang. "Person Re-Identification by Unsupervised L1 Graph Learning". In Computer Vision—ECCV 2016: 14th European Conference, Amsterdam, The Netherlands, Oct. 11-14, 2016, Proceedings, Part I; Leibe, Bastian, Matas, Jiri, Sebe, Nicu, Welling, Max; Springer International Publishing: Cham, 2016; pp. 178-195.
Jeng, Peixi, Tao Xiang, Yaowei Wang, Massimiliano Pontil, Shaogang Gong, Tiejun Huang, and Yonghong Tian. "Unsupervised cross-dataset transfer learning for person re-identification." In Proceedings of the IEEE Conference on Computer Vision and Pattern Recognition, pp. 1306-1315. 2016.

* cited by examiner

*Primary Examiner* — Idowu O Osifade
(74) *Attorney, Agent, or Firm* — Canon U.S.A., Inc. IP Division

(57) ABSTRACT

A method of comparing objects in images. A dictionary determined from a plurality of feature vectors formed from a test image and codes formed by applying the dictionary to the feature vectors, is received. The dictionary is based on a modified manifold obtained by determining correspondences for codes using pairwise similarities between codes. Comparison codes are determined for the objects in the images by applying the dictionary to feature vectors of the objects in the images. The objects in the images are compared based on the comparison codes of the objects.

15 Claims, 8 Drawing Sheets

METHOD, SYSTEM AND APPARATUS FOR COMPARING OBJECTS IN IMAGES

TECHNICAL FIELD

The present invention relates generally to image processing and, in particular, to matching objects between two captured images to determine whether a candidate object is an object of interest. The present invention also relates to a method, apparatus and system for comparing objects in images, and to a computer program product including a computer readable medium having recorded thereon a computer program for comparing objects in images.

BACKGROUND

Public venues such as shopping centres, parking lots and train stations are increasingly subject to surveillance using large-scale networks of video cameras. Application domains of large-scale video surveillance include security, safety, traffic management and business analytics. In one example application from the security domain, a security officer may want to view a video feed containing a particular suspicious person in order to identify undesirable activities. In another example from the business analytics domain, a shopping centre may wish to track customers across multiple cameras in order to build a profile of shopping habits.

Many surveillance applications require methods, known as "video analytics", to detect, track, match and analyse multiple objects of interest across multiple camera views. In one example, referred to as a "hand-off" application, object matching is used to persistently track multiple objects across first and second cameras with overlapping fields of view. In another example application, referred to as "re-identification", object matching is used to locate a specific object of interest across multiple cameras in the network with non-overlapping fields of view.

Cameras at different locations may have different viewing angles and work under different lighting conditions, such as indoor and outdoor. The different viewing angles and lighting conditions may cause the visual appearance of a person to change significantly between different camera views. In addition, a person may appear in a different orientation in different camera views, such as facing towards or away from the camera, depending on the placement of the camera relative to the flow of pedestrian traffic. Robust person matching in the presence of appearance change due to camera viewing angle, lighting and person orientation is a challenging problem.

In most person matching methods, the appearance of a person is represented by a "descriptor", also referred to as an "appearance descriptor" or "feature vector". A descriptor is a derived value or set of derived values determined from the pixel values in an image of a person. One example of a descriptor is a histogram of colour values. Another example of a descriptor is a histogram of quantized image gradient responses.

In some known methods for person matching, known as "supervised learning", a projection is learned from pairs of images of people captured from a pair of cameras. In each pair of images, the first image is captured from the first camera and the second image is captured from the second camera. Pairs of images of the same person are known as "positive" training images. Pairs of images of different people are known as "negative" training images. Pairs of appearance descriptors extracted from positive training images are known as "positive" training samples. Pairs of appearance descriptors extracted from negative training images are known as "negative" training samples.

The projection is learned with information related to whether the image pairs are positive or negative training samples. In one known method, known as "distance metric learning", a projection is learned to minimize a distance between the appearance descriptors in each positive training sample and maximize the distance between the appearance descriptors in each negative training sample. In another method, known as "linear discriminative analysis", a set of projections are learned to separate appearance descriptors associated with different positive training samples in a common subspace. In another method, known as "canonical correlation analysis", a set of projections are learned to maximize the correlation between the appearance descriptors in each positive training sample in a common subspace.

The supervised learning methods may be impractical due to the need for positive training images. In practice, generating a set of positive training images is time consuming and requires intense manual labour. Furthermore, people may appear infrequently in some camera views, such as remote perimeters, making the collection of a large set of positive training images impractical. Therefore, methods, known as "unsupervised learning", resort to learning a discriminative representation of appearance descriptors without the need to capture large quantities of positive training images in every pair of cameras.

In some known unsupervised methods for person matching, known as "dictionary learning", a "dictionary" is learned to encode a compact, discriminative representation of an appearance descriptor. A dictionary consists of a set of dictionary "atoms" or basis vectors. An appearance descriptor of a person can be reconstructed as a linear weighted sum of dictionary atoms, each atom being weighted by a coefficient. The coefficients for all dictionary atoms collectively form a "code". Given an appearance descriptor, the corresponding code is determined by finding the weighted sum of dictionary atoms that minimizes a difference, known as a "reconstruction error", between the appearance descriptor and a reconstruction of the appearance descriptor using the dictionary atoms. A dissimilarity score (e.g., Euclidean distance), between the codes of a pair of images determines if the pair of image is matched.

In one known dictionary learning method, known as "cross-dataset dictionary learning", multiple dictionaries are learned to model the similarities and differences between the appearance of people in different datasets collected from different environments. In the method, a shared dictionary represents characteristics of appearance that are common to all the datasets, and an independent residual dictionary for each dataset represents the characteristics of appearance unique to each environment. Furthermore, a target dictionary represents characteristics of appearance in the target dataset that are not captured by the shared dictionary or residual dictionaries. However, the cross-dataset dictionary learning method requires a prior knowledge of a matching correspondence between training images received from query and gallery cameras in the target dataset. The matching correspondence may be obtained from a manual annotation or may be obtained by asking people to appear in the fields of views of the query and gallery cameras during the data collection. Additionally, the cross-dataset dictionary learning method requires positive training images from other datasets collected from environments different from the target environment.

Another known dictionary learning method, known as "$l_1$ graph-based dictionary learning", uses a $l_1$-norm graph regularisation term in the dictionary learning formulation to improve the robustness of the dictionary against outliers caused by changes in background, pose, and occlusion. However, the $l_1$ graph-based dictionary learning method requires a prior knowledge of a matching correspondence between training images received from query and gallery cameras. The matching correspondence may be obtained from a manual annotation or may be obtained by asking people to appear in the fields of views of the query and gallery cameras during the data collection.

SUMMARY

According to an aspect of the present invention, a method of comparing objects in images includes receiving a dictionary determined from a plurality of feature vectors formed from a test image and codes formed by applying the dictionary to the feature vectors, wherein the dictionary is based on a modified manifold obtained by determining correspondences for codes using pairwise similarities between codes, determining comparison codes for the objects in the images by applying the dictionary to feature vectors of the objects in the images, and comparing the objects in the images based on the comparison codes of the objects.

Further features of the present invention will become apparent from the following description of embodiments with reference to the attached drawings.

BRIEF DESCRIPTION OF THE DRAWINGS

One or more example embodiments of the invention will now be described with reference to the following drawings, in which.

DESCRIPTION OF THE EMBODIMENTS

Figure 1:
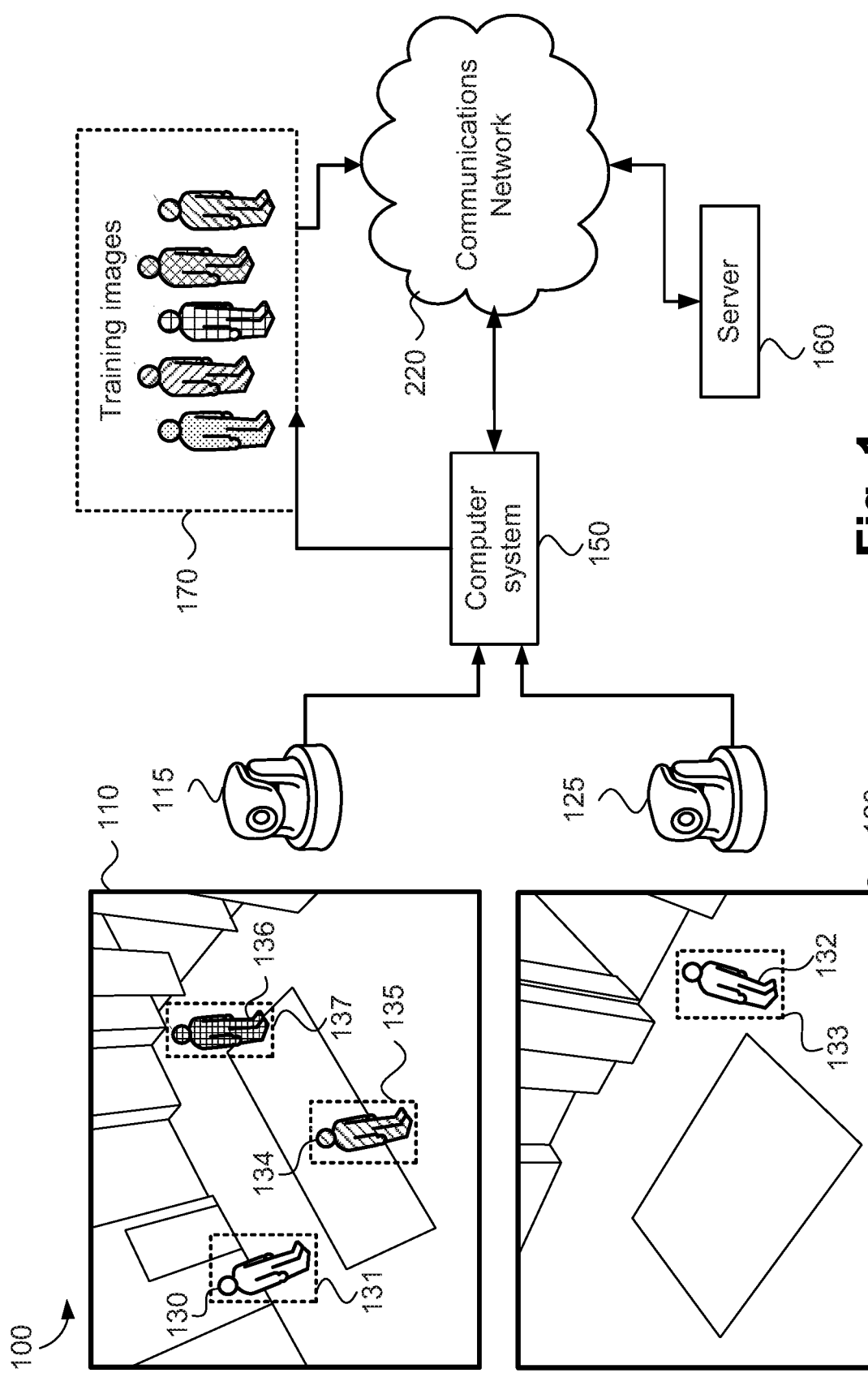
FIG. 1 shows a surveillance system comprising cameras connected to a computer system and a cloud service for analysing objects of interest, to which the arrangements may be applied.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and the section above relating to prior art arrangements relate to discussions of documents or devices which may form public knowledge through their respective publication and/or use. Such discussions should not be interpreted as a representation by the present inventors or the patent applicant that such documents or devices in any way form part of the common general knowledge in the art.

An image, such as an image 110 in FIG. 1, is made up of visual elements. The image 110 is captured using an image capture device such as a digital camera or video camera. The term "pixel", also referred to as a "pixel location" or "image location", refers in the present disclosure to one of the visual elements in a captured image. Each pixel of an image is described by one or more values characterising a property of a scene captured in the image. In one example, a single intensity value characterises a brightness of the scene at a pixel location. In another example, a triplet of values characterise a colour of the scene at the pixel location.

A "region", also referred to as an "image region", in an image refers to a collection of one or more spatially adjacent visual elements. A "bounding box" refers to a rectilinear image region enclosing an object or part of an object in an image. In one example, the bounding box 131 in FIG. 1 encloses a person 130. A "feature", also referred to as an "appearance descriptor" or "descriptor", represents a derived value or set of derived values determined from the pixel values in an image region. One example of an appearance descriptor is a histogram of colour values in an image region. Another example of an appearance descriptor is a histogram of quantized image gradient responses in a region.

The phrase "foreground mask" refers to a binary image with non-zero values at pixel locations corresponding to an object of interest. In one example, the terms "candidate object" and "object of interest" refer to a person in a crowd that has been identified as being of particular interest. A non-zero pixel location in a foreground mask is known as a "foreground pixel". In one arrangement, a foreground mask is determined using a statistical background pixel modelling method such as Mixture of Gaussian (MoG), wherein the background model is maintained over multiple frames with a static camera. In another arrangement, foreground detection is performed on Discrete Cosine Transform blocks. In yet another arrangement, a foreground mask is determined using unsupervised segmentation, for example, using superpixels. Any suitable method for determining a foreground mask may equally be practised.

The present description provides a method and system for comparing objects in images captured from a first pair of cameras, based on dictionary learning using images of objects. FIG. 1 shows an example surveillance system 100 upon which arrangements described can be practiced. In one example, the described method may be used to determine whether an object observed in an image 120 of a first scene captured by a first digital camera 125 has the same identity as a second object detected in an image 110 of a second scene captured by a second digital camera 115. In the arrangements described, the terms "object", "person" and "target" relate to "an object of interest" within at least partial view of one of the cameras 125 and 115. Disclosed arrangements may equally be applied when the images are captured with different environmental factors. For example, the images may be captured by different cameras simultaneously or at different times, or captured by the same camera at different times, including images that represent the same scene or different scenes.

Figure 2A:
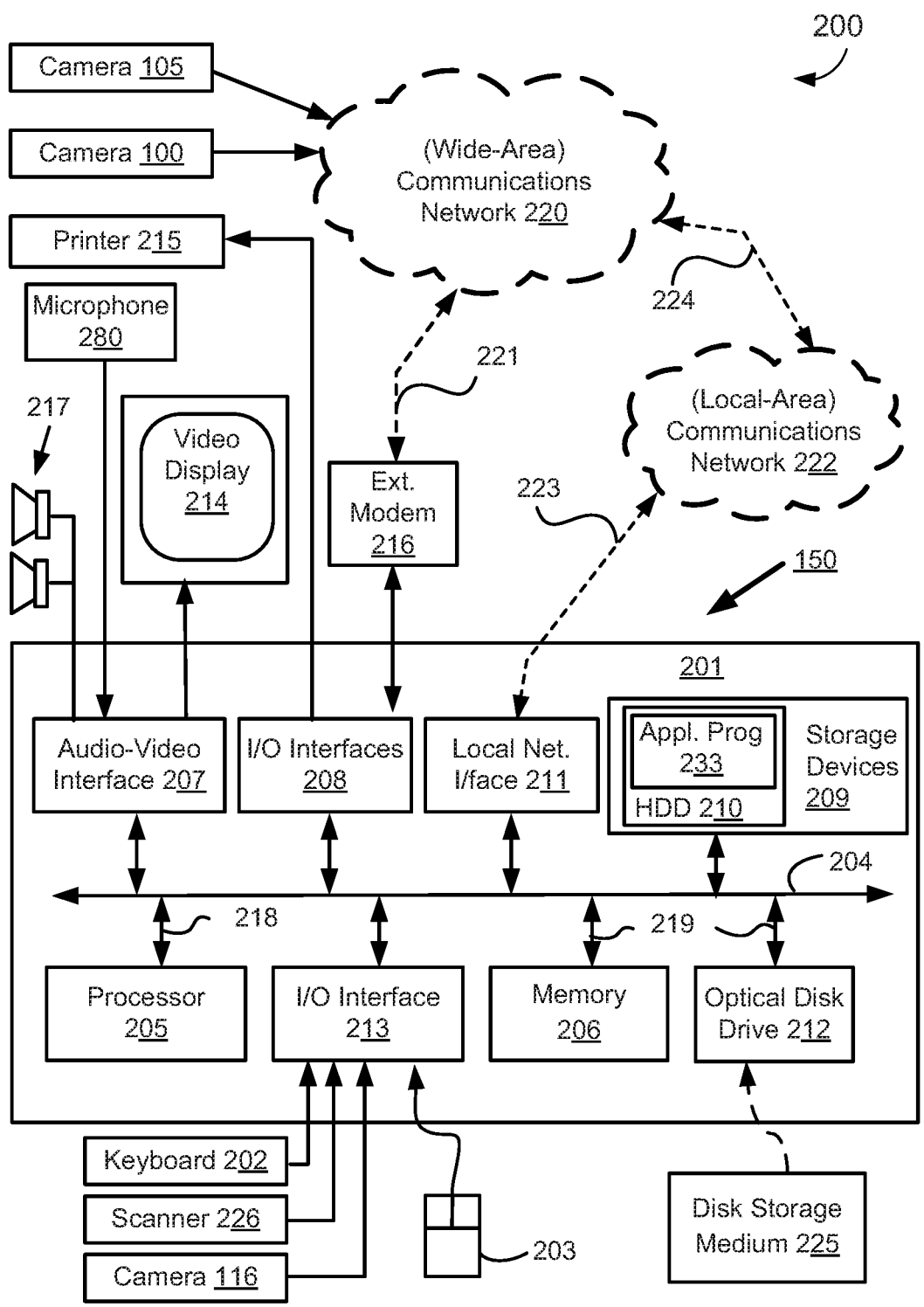
FIGS. 2A and 2B form a schematic block diagram of the computer system of FIG. 1 upon which the arrangements described can be practiced.
Figure 2B:
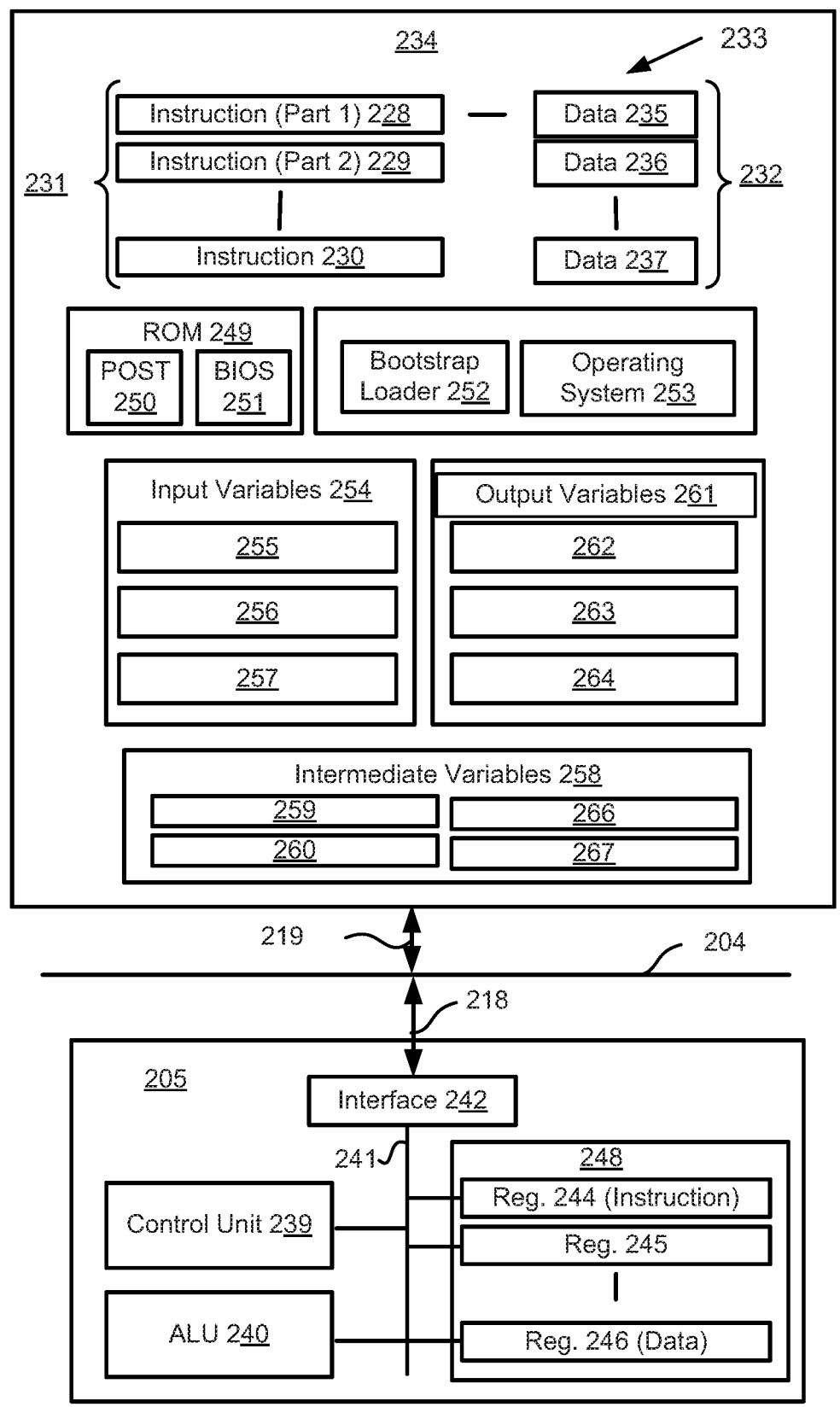

The cameras 115 and 125 may be any type of image capture device suitable for capturing an image of a scene using a sensor such as an optical sensor, an infrared sensor, a radar sensor, and the like or be multi-sensor devices. The images used for matching objects are captured by the same type of sensor. The cameras 115 and 125 may be a digital camera, for example. The cameras 115 and 125 are connected to a computer system 150 as seen in FIGS. 2A and 2B. The computer system 150 is connected to a cloud server 160, via a communications network 220, to which arrangements described may be applied. The cameras 115 and 125 may be in wired or wireless communication with the computer system 150, and the computer system 150 may be in wired or wireless communication with the cloud server 160.

The terms "re-identification", "hand-off" and "matching" relate to the task of relating an object of interest within at least partial view of a video camera (e.g., the camera 115) to another object within at least a partial view of the same or another video camera (e.g., the camera 125).

For the example in FIG. 1, a first object is known as a "query" object, and a second object is known as a "gallery" object. A query object may be a person who has been identified as being suspicious at an airport. A gallery object is a person in a crowded airport, where the person is merely a member of the crowd. The gallery object may also be referred to as a "candidate object". In one example, a person 132 in an image 120 is a query object, and three people 130, 134 and 136 in an image 110 are gallery objects. The arrangements described may be applied to determine which of the three gallery objects 130, 134 and 136 is a best match for the query object 132.

The example of FIG. 1 may be applied to a range of applications. In one example, the computer system 150 allows a security guard to select a query object through an interactive user interface, and returns images of one or more gallery objects determined to match the query object. In another example, the computer system 150 may be configured to automatically select a query object and match the object across multiple distributed cameras in order to analyse the long-term behaviour of the object. In other arrangements, the computer system 150 is integral to one of the cameras 115 and 125.

While the described examples generally relate to surveillance tasks of monitoring persons, the described methods may equally be practised on other types of objects. For example, the described methods may be applied to track a suspicious vehicle. The described methods may also be implemented using different types of sensors including near infra-red (IR) cameras, radar sensors, and laser scanners.

For the example in FIG. 1, the query and gallery objects may be matched by extracting an appearance descriptor for the query object from a bounding box 133, and appearance descriptors for the gallery objects 130, 134 and 136 from the bounding boxes 131, 135 and 137 respectively. A similarity score may be determined between the query object and each gallery object based on the appearance descriptors. The gallery object with the greatest similarity to the query object is determined to have the same identity as the query object.

The similarity score is in part based on a learned representation of object appearance determined using dictionary learning. The learned representation, represented by atoms in the dictionary, is derived from a set of training images of objects of the same type as the query and gallery object without knowledge of the identity of the object in each image. The training images originate from a training data set, collected from the query and gallery cameras. For the example shown in FIG. 1, the training data 170 is collected from cameras 115 and 125 during a training phase of operation, and communicated from the computer system 150, via a communications network 220, to a cloud server 160. A dictionary is learned on the cloud server 160 based on the training data 170, and transmitted back to the computer system 150. FIGS. 2A and 2B depict the computer system 150, upon which the arrangements described can be practised.

As seen in FIG. 2A, the computer system 150 includes: a computer module 201; input devices such as a keyboard 202, a mouse pointer device 203, a scanner 226, one or more cameras such as the cameras 115 and 125, and a microphone 280; and output devices including a printer 215, a display device 214 and loudspeakers 217. An external Modulator-Demodulator (Modem) transceiver device 216 may be used by the computer module 201 for communicating to and from remote cameras such as the cameras 100 and 105 over the communications network 220 via a connection 221. The communications network 220 may be a wide-area network (WAN), such as the Internet, a cellular telecommunications network, or a private WAN. Where the connection 221 is a telephone line, the modem 216 may be a traditional "dial-up" modem. Alternatively, where the connection 221 is a high capacity (e.g., cable) connection, the modem 216 may be a broadband modem. A wireless modem may also be used for wireless connection to the communications network 220.

The cameras 115 and 125 may be remote cameras forming part of a camera network. In the arrangements described, the cameras 115 and 125 relate to video cameras. The camera network may comprise any type of image capture devices capable of capturing image and/or video data from which vanishing points can be determined. The camera network may comprise a plurality of a single type of image capture device. In other arrangements, image capture devices integral or proximate to the computer module 201, can form part of the camera network.

The computer module 201 typically includes at least one processor unit 205, and a memory unit 206. For example, the memory unit 206 may have semiconductor random access memory (RAM) and semiconductor read only memory (ROM). The computer module 201 also includes an number of input/output (I/O) interfaces including: an audio-video interface 207 that couples to the video display 214, loudspeakers 217 and microphone 280; an I/O interface 213 that couples to the keyboard 202, mouse 203, scanner 226, camera 116 and optionally a joystick or other human interface device (not illustrated); and an interface 208 for the external modem 216 and printer 215. In some implementations, the modem 216 may be incorporated within the computer module 201, for example within the interface 208. The computer module 201 also has a local network interface 211, which permits coupling of the computer system 150 via a connection 223 to a local-area communications network 222, known as a Local Area Network (LAN). As illustrated in FIG. 2A, the local communications network 222 may also couple to the wide network 220 via a connection 224, which would typically include a so-called "firewall" device or device of similar functionality. The local network interface 211 may comprise an Ethernet circuit card, a Bluetooth® wireless arrangement or an IEEE 802.11 wireless arrangement; however, numerous other types of interfaces may be practised for the interface 211.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 150.

The components 205 to 213 of the computer module 201 typically communicate via an interconnected bus 204 and in a manner that results in a conventional mode of operation of the computer system 150 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun Sparcstations, Apple Mac™ or a like computer systems.

The methods described may be implemented using the computer system 150 wherein the processes of FIGS. 3, 4, 5, 6 and 7, to be described, may be implemented as one or more software application programs 233 executable within the computer system 150. In particular, the steps of the methods described are effected by instructions 231 (in FIG. 2B) in the software 233 that are carried out within the computer system 150. The software instructions 231 may be formed as one or more code modules, each for performing one or more particular tasks. The software may also be divided into two separate parts, in which a first part and the corresponding code modules performs the methods described and a second part and the corresponding code modules manage a user interface between the first part and the user.

The software 233 may be stored in a computer readable medium, including the storage devices described below, for example. The software 233 is typically stored in the HDD 210 or the memory 206. The software is loaded into the computer system 150 from the computer readable medium, and then executed by the computer system 150. Thus, for example, the software 233 may be stored on an optically readable disk storage medium (e.g., CD-ROM) 225 that is read by the optical disk drive 212. A computer readable medium having such software or computer program recorded on the computer readable medium is a computer program product. The use of the computer program product in the computer system 150 preferably effects an advantageous apparatus for implementing the methods described.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 150 from other computer readable media. Computer readable storage media refers to any non-transitory tangible storage medium that provides recorded instructions and/or data to the computer system 150 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of software, application programs, instructions and/or data to the computer module 201 include radio or infra-red transmission channels as well as a network connection to another computer or networked device, and the Internet or Intranets including e-mail transmissions and information recorded on Websites and the like.

The second part of the application programs 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 150 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the system 150 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 150 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using the connection 218. The memory 234 is coupled to the bus 204 using the connection 219.

The application program 233 includes the sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The arrangements described use input variables 254, which are stored in the memory 234 in corresponding memory locations 255, 256, 257. The arrangements described produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:
 a fetch operation, which fetches or reads an instruction 231 from a memory location 228, 229, 230;
 a decode operation in which the control unit 239 determines which instruction has been fetched; and
 an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the processes of FIGS. 4, 5, 6 and 7 is associated with one or more segments of the program 233 and is performed by the register section 244, 245, 247, the ALU 240, and the control unit 239 in the processor 205 working together to perform the fetch, decode, and execute cycles for every instruction in the instruction set for the noted segments of the program 233.

The methods described may alternatively be implemented in dedicated hardware such as one or more integrated circuits performing the functions or sub functions. Such dedicated hardware may include graphic processors, digital signal processors, or one or more microprocessors and associated memories, and may reside on platforms such as video cameras.

Figure 3:
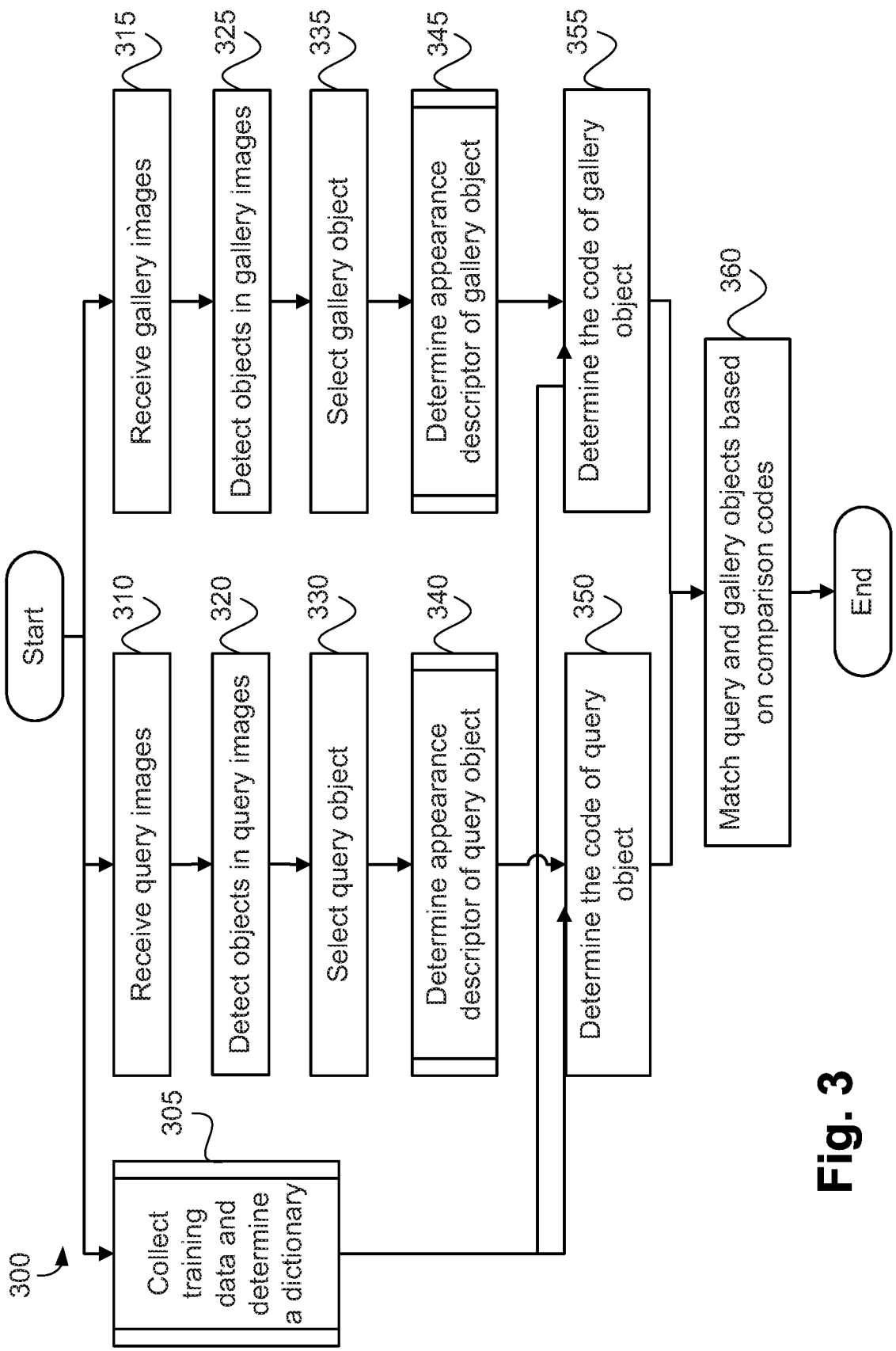
FIG. 3 is a schematic flow diagram showing a method of matching objects between a query image and a gallery image using a learned dictionary.

FIG. 3 shows a method 300 of matching objects between images by comparing codes determined using dictionary learning.

In one example, the matching method 300 is used to determine a gallery object in an image matched to the query object. The method 300 may be implemented by one or more software code modules of the application 233, stored in the hard disk drive 210 and being controlled under execution of the processor 205. In some arrangements, portions of the method 300 are executed on a processor of a cloud server computer, such as the cloud server 160.

The method 300 is described by way of example with reference to the query image 120 containing the object of interest 132 detected at the bounding box 133, and the gallery image 110 containing candidate objects 130, 134 and 136, detected at the bounding boxes 131, 135 and 137. In the example described, the method 300 is used to determine which of the detections 131, 135 and 137 is the object of interest 132, detected at 133. The following description provides details, examples and alternative implementations for the main steps of the method 300. Further details, examples and alternative implementations of step 305, 340 and 345 are described below.

The method 300 starts at a determining step 305. At step 305, a dictionary is determined (or "learned") based on a training dataset collected from the query 125 and gallery cameras. In some arrangements, the training images are processed on the computer system 150 to extract appearance descriptors, which are then transmitted to the cloud server 160, via the network 220, to learn a dictionary. In other arrangements, the training images are transmitted to the cloud server 160 for processing. In yet other arrangements, image processing and dictionary learning are processed locally on the computer system 150. A method 400 of collecting training data and determining (or "learning") a dictionary, as executed at step 305 of method 300, is described below with reference to FIG. 4. The output of step 305 is a dictionary for determining codes. As described in detail below, the codes are determined by applying the dictionary to appearance descriptors determined for the images captured by the query 125 and gallery cameras. The dictionary may be stored in the memory 206.

The method 300 also starts at a receiving step 310. At execution of the step 310, at least one image containing a query object is received as input. For example, the image 120 is a query image received from a query camera 125 containing a query object 132. The image 120 may be stored in the memory 206. The method 300 progresses under execution of the processor 205 from the receiving step 310 to a detecting step 320. At the detecting step 320, a query object is detected from the received query images. One example of detecting the query object uses a pedestrian detection method to detect all persons in the query images. A commonly-used pedestrian detection method learns a detector to search for persons within an image by scanning pixel locations. The detector produces a high score if the local image features inside the local search window meet certain criteria. The local image feature may be the histogram of oriented gradients or local binary pattern. Other pedestrian detection methods include a part-based detection method and a background subtraction method. The output of the pedestrian detection method is a set of bounding boxes. The image region defined by each bounding box contains a person.

The method 300 progresses under execution of the processor 205 from the detecting step 320 to a selecting step 330. In one arrangement, a user such as a security guard manually selects an automatically detected bounding box, such as the bounding box 133, as the query object via a graphical user interface executing on the module 201. In another arrangement, the user manually draws a bounding box containing an object to define the query object via a graphical user interface executing on the module 201. In yet another arrangement, an algorithm executing on the module 201 automatically selects an automatically detected bounding box, such as the bounding box 133, as the query object based on pre-defined rules. The output of step 330 is an image region within a bounding box for the query object.

The method 300 progresses under execution of the processor 205 from the step 330 to a determining step 340. An appearance descriptor for the query object is determined at step 340 based on pixels in the image region determined at step 330. A method 500 of determining an appearance descriptor of an object, as executed at step 340, will be described below with reference to FIG. 5. The output of step 340 is an appearance descriptor characterizing the query object.

The method 300 progresses under execution of the processor 205 from step 340 to a determining step 350, where a code for the query object is determined by applying the learned dictionary determined at step 305 to the appearance descriptor determined at step 340. In one arrangement, the code a' for an appearance descriptor x determined at step 340 is determined by solving the Lasso problem shown in Equation (1) using a sparse coding algorithm (e.g., least angle regression algorithm).

$$a' = \mathrm{argmin}_a \|x - Da\|_2^2 + \lambda \|a\|_1 \quad (1)$$

where $\|\cdot\|_2$ denotes the 2-norm of a vector, $\|\cdot\|_1$ denotes the 1-norm of a vector, D represents the learned dictionary, x represents the appearance descriptor, a represents the code, and $\lambda$ represents a regularisation factor. The regularisation factor may be pre-defined (e.g., $\lambda=0.01$), or may be determined during the "training" phase using known methods such as cross-validation. In another arrangement, the comparison code a' for an appearance descriptor x is determined by solving a regularised least squares problem to determine the closed-form solution of Equation (2), as follows:

$$a' = (D^T D + \rho I)^{-1} D^T x \quad (2)$$

where $D^T$ represents the transpose of the dictionary matrix, I is an identity matrix, and $\rho$ is a regularisation factor. In one arrangement, the regularization factor is predefined (e.g., $\rho=0.5$). In another arrangement, the regularization factor is determined during the "training" phase using any suitable method such as cross-validation. The output of step 350 is a code corresponding to the query object selected at step 330. The code may be stored in the memory 206.

As seen in FIG. 3, the method 300 also starts at a receiving step 315. In one arrangement, steps 305, 310 and 315 start concurrently. In another arrangement, steps 305, 310 and 315 are executed at different times. In all arrangements, step 305 is executed before steps 350 and 355. In some arrangements, step 305 is executed during an initial installation or "training" phase, while the remaining steps in method 300 are executed during routine operation after the "training" phase has finished. Furthermore, steps 350 and 355 are executed before step 360 in all arrangements.

At execution of step 315, at least one image containing gallery objects is received as input. For example, the image 110 is a gallery image received from a gallery camera 115 containing gallery objects 132, 134 and 136. The method 300 progresses under execution of the processor 205 from step 315 to a detecting step 325. At step 325, a set of gallery objects is detected in the received gallery images. In one arrangement, step 325 is implemented for gallery objects in a similar manner to step 320 for query objects. The output of step 325 is a set of bounding boxes, such as the bounding boxes 131, 135 and 137 corresponding to the gallery objects 130, 134 and 136.

The method 300 progresses under execution of the processor 205 from step 325 to a selecting step 335. At the selecting step 335, a gallery object is selected for comparing with the query object determined at step 330. In one arrangement, the gallery objects determined at detecting step 325 are stored in a list, for example in the memory 206, and a gallery object is selected by enumerating the objects in the list. In other arrangements, step 335 is implemented for gallery objects in a similar manner to step 330 for query objects. The output of the selecting step 335 is an image region within a bounding box for the gallery object. The image region output at step 335 may be stored in the memory 206.

The method 300 progresses under execution of the processor 205 from the step 335 to a determining step 345. An appearance descriptor for the gallery object is determined at step 345 based on pixels in the image region determined at step 335. Further details, examples and alternative implementations of the step 345 are described hereinafter with reference to FIG. 5. The output of step 345 is an appearance descriptor characterizing the gallery object. Again, the appearance descriptor output at step 345 may be stored in the memory 206.

The method 300 progresses under execution of the processor 205 from step 345 to a determining step 355, where a code for the gallery object is determined. In one arrangement, step 355 is implemented for the gallery object in a similar manner to step 350 for the query object. The output of step 355 is a code corresponding to the gallery object selected at step 335. The code output at step 355 may be stored in the memory 206.

After execution of steps 350 and 355, the method 300 progresses under execution of the processor 205 to a matching step 360. At the matching step 360, the code of the selected query object determined at step 350 and the code of the selected gallery object determined at step 355 are compared to determine whether the codes correspond indicating that the objects have the same identity. In one arrangement, a comparison is performed at step 360 by determining correspondences between the codes based a similarity or dissimilarity score between the codes. One example of a dissimilarity score is a Euclidean distance between the codes. One example of a similarity score is a Cosine distance between the codes. Any other suitable similarity or dissimilarity scores may be determined to compare two codes.

One example of determining whether the two objects match (i.e., have the same identity) is to compare a similarity score to a fixed threshold. If a similarity score exceeds the threshold, the query and gallery object are determined to have the same identity.

Another example of determining whether the query object has the same identity as the gallery object is to compare the similarity score to the similarity score between the query object and all other objects in the video stream. If the similarity score for the gallery object is greater than all other objects, then the query and gallery object are determined to have the same identity.

The computer system 150 generates a response if the two objects are determined to have the same identity. In one example, the match is communicated to a user through a graphical user interface, for example, displayed on the display 214. In another example, the response is to tag the gallery object for further automatic analysis, such as tracking the gallery object through the field of view of the gallery camera 115.

The method 300 concludes after completing the matching step 360.

Figure 4:
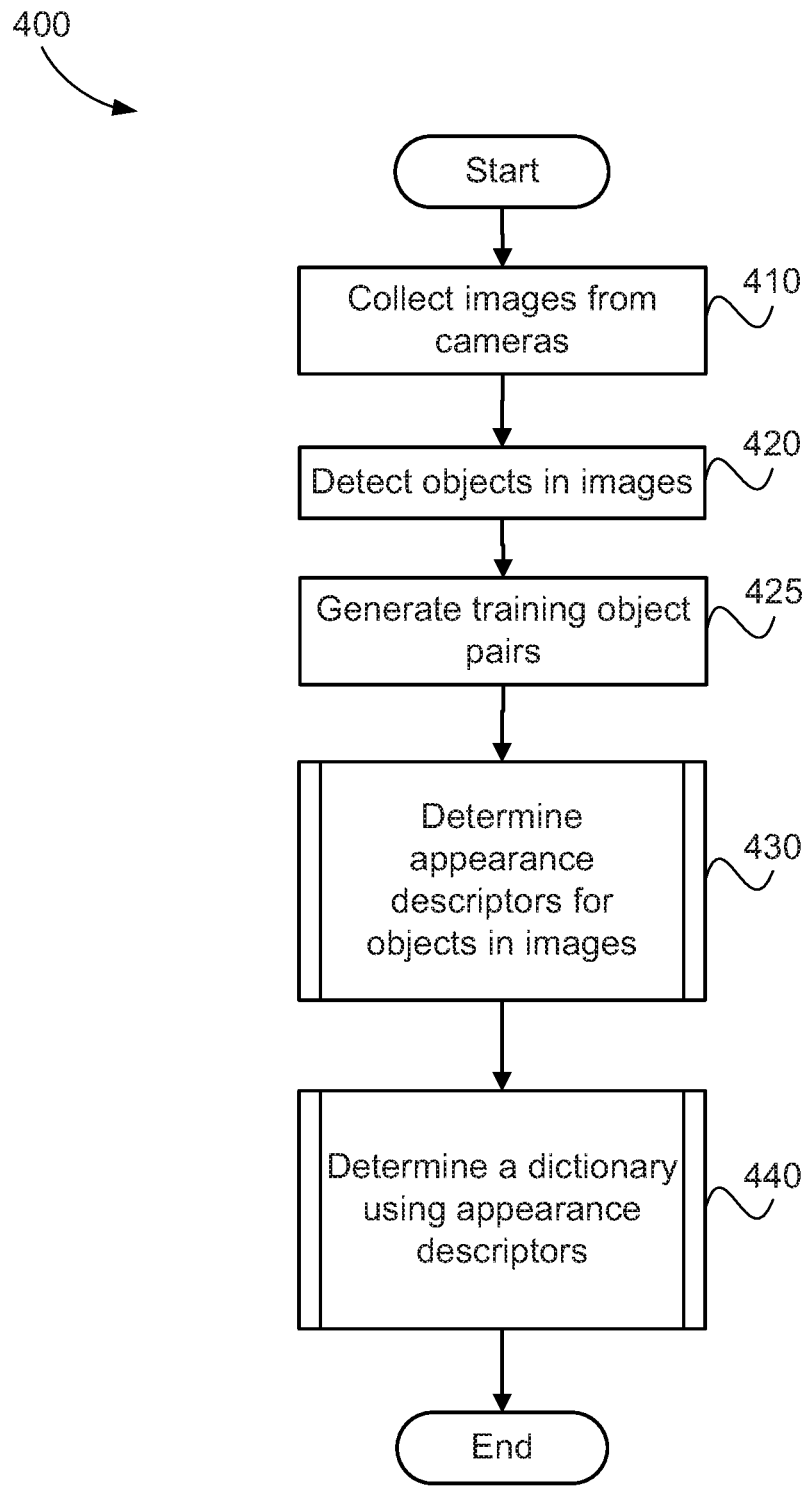
FIG. 4 is a schematic flow diagram of a method of collecting a training dataset and determining a dictionary based on the collected training dataset as used in the method of FIG. 3.

The method 400 of collecting training data and determining a dictionary, as executed at step 305 of method 300, is now described with reference to FIG. 4. The method 400 may be implemented at least in part as one or more software code modules of the software application program 233 resident in the hard disk drive 210 and being controlled in execution by the processor 205. The method 400 may in some arrangements be executed at least in part on a processor of the cloud server 160.

The method 400 starts at a collecting step 410. In execution of the step 410, images containing a plurality of objects are collected from two or more cameras installed at a customer site. For the example application in FIG. 1, cameras 115 and 125 are examples of cameras installed at a customer site, and images 110 and 120 are examples of images containing a plurality of objects. The images collected at step 410 may be stored within the memory 206.

The method 400 passes under execution of the processor 205 from step 410 to a detecting step 420. At step 420, a set of objects is detected in the images from the two or more cameras 115 and 125 collected at step 410. In one arrangement, at step 420, objects in the images are detected in a similar manner to step 320 for detecting objects in query images. The output of step 420 is a set of bounding boxes, such as the bounding boxes 131, 133, 135 and 137 corresponding to the objects 130, 132, 134 and 136 in the images 110 and 120. The determined bounding boxes may be stored in the memory 206.

The method 400 passes under execution of the processor 205 from step 420 to generating step 425, where pairs of training objects, each object in each pair being detected in a different camera, are generated based on the objects detected at step 420. In one arrangement, a first camera with the minimum number of detected objects over all cameras is determined, and a commensurate set of objects are randomly selected from a second camera. In another arrangement, a first camera with a maximum number of detected objects over all cameras is determined. Then, the bounding boxes corresponding to detected objects in a second camera are randomly configured to generate new pseudo-detections, such that the total number of detections in the second camera matches the number of detections in the first camera.

The method 400 progresses under execution of the processor 205 from the step 420 to a determining step 430. An appearance descriptor for each detected object is determined at step 430 based on pixels in the bounding box corresponding to the detected object, as determined at step 420 and 425. The appearance descriptor is determined in accordance with the method 500 which will be described below with reference to FIG. 5. The output of step 430 is a set of appearance descriptors describing the detected objects in the images. The set of appearance descriptors determined at step 430 is also known as the training data which may be stored in the memory 206.

The method 400 progresses under execution of the processor 205 from step 430 to a determining step 440. At step 440, the training data is used to determine (or learn) a dictionary.

Figure 6:
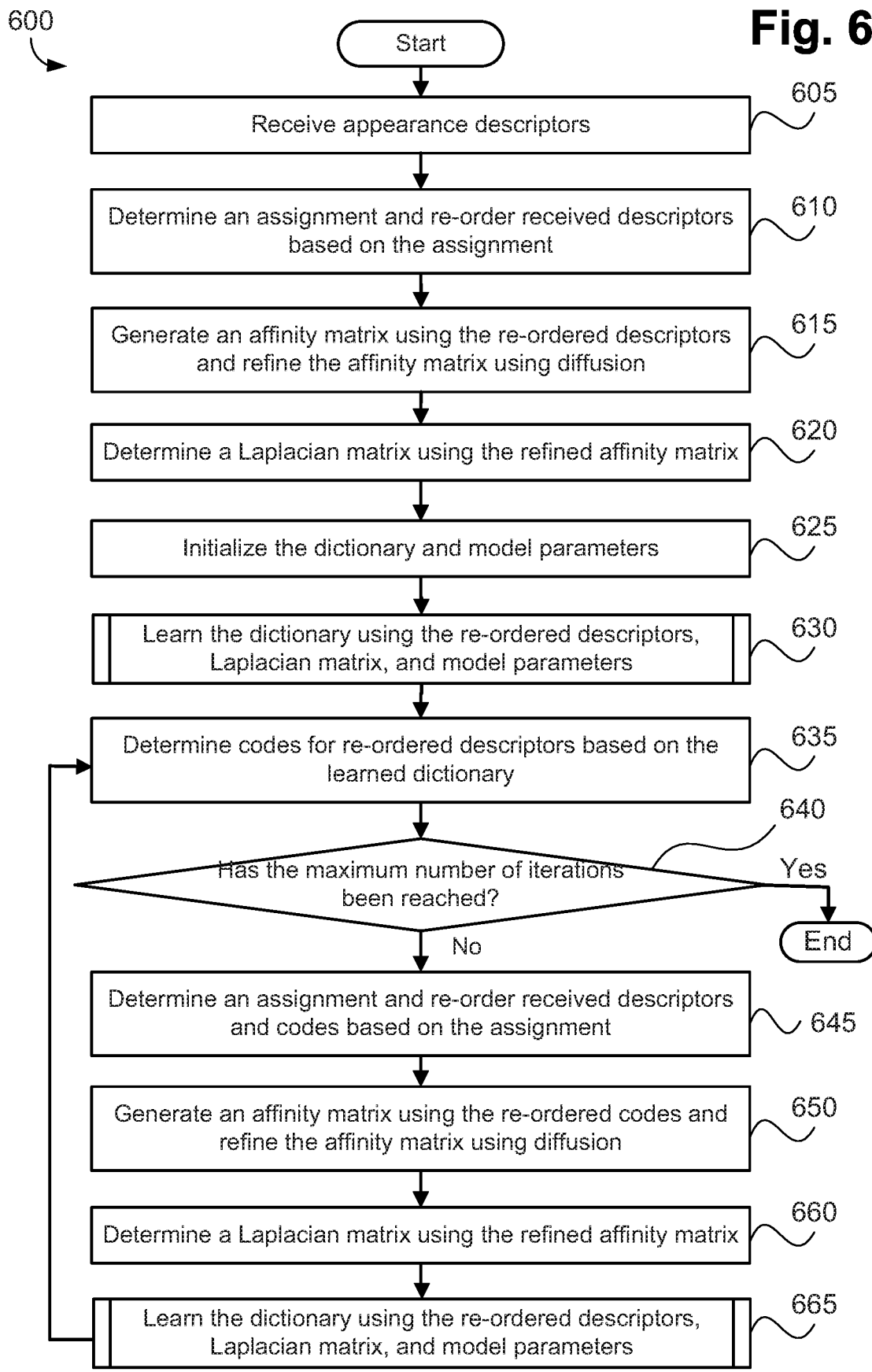
FIG. 6 is a schematic flow diagram of a method of determining a dictionary using appearance descriptors as used in the method of FIG. 4.

A method 600 of determining a dictionary using the training data, as executed at step 440, will be described below with reference to FIG. 6.

In one arrangement, the dictionary is learned on a customer server such as the computer system 150 in FIG. 1. In another arrangement, the dictionary is learned at a cloud server such as the cloud server 160. In the arrangement where the dictionary is learned at the cloud server 160, the training dataset determined at step 430 is transmitted via the network 220 from the customer server to the cloud server prior to the execution of step 440. After execution of step 440, the learned dictionary is transmitted via the Internet from the cloud server 160 back to the customer server.

The method 400 concludes after completing the determining step 440.

Figure 5:
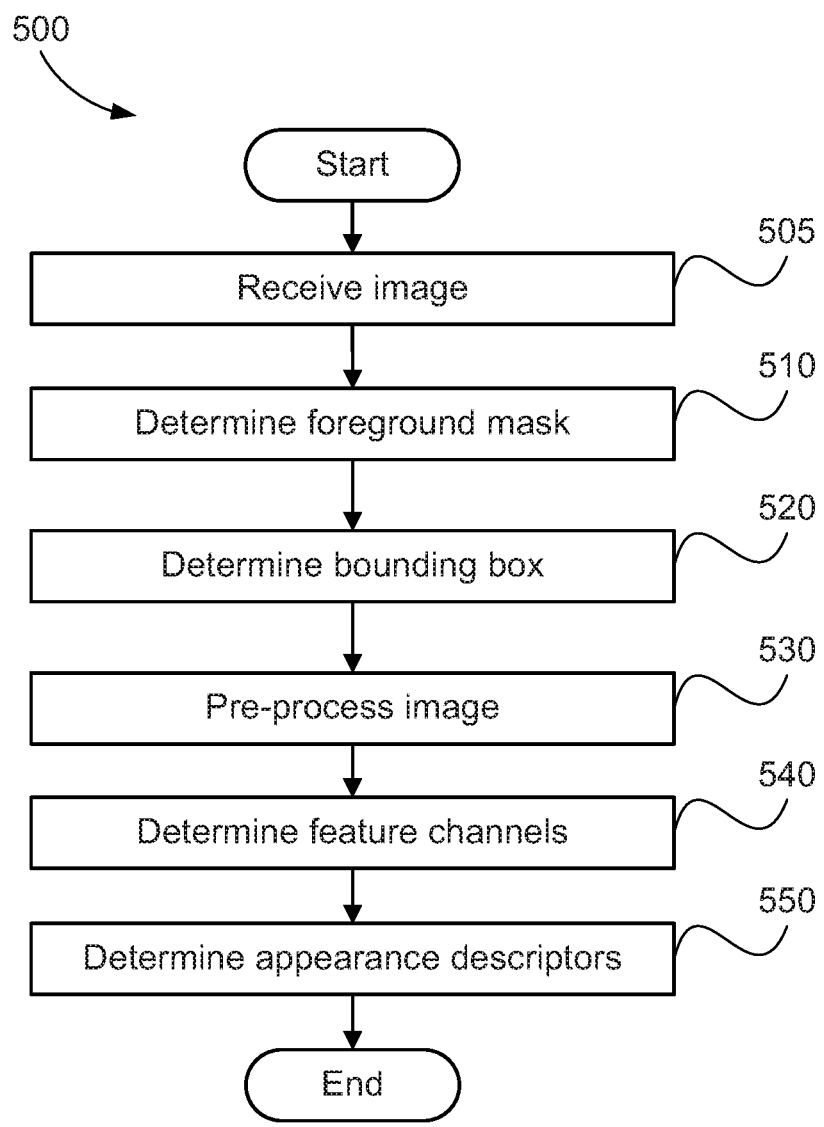
FIG. 5 is a schematic flow diagram of a method of determining an appearance descriptor of an object as used in the method of FIG. 3 and the method of FIG. 4.

The method 500 of determining an appearance descriptor of an object, as executed at the steps 340 and 345 of the method 300 and steps 430 of the method 400, is now described with reference to FIG. 5. The method 500 may be implemented within the module 201 as one or more software code modules of the software application program 233 resident in the hard disk drive 210 and being controlled by execution of the processor 205.

The method 500 starts at a receiving step 505, in which an image or image sequence containing an object and a corresponding bounding box, such as the bounding box selected at step 330 or 335, are received as input. The image or image sequence may be stored in the memory 206. In one arrangement, the bounding box contains the whole body of a person. In one example, when the method 500 is applied to the query object 132 shown in FIG. 1, step 505 receives the image 120 and the bounding box 133 as input. In another example, the bounding boxes containing head regions of persons are received.

The method 500 passes under execution of the processor 205 from the step 505 to a determining step 510. At step 510, a foreground confidence mask is determined under execution of the processor 205 and may be stored in the memory 206. The foreground confidence mask assigns to each pixel in the bounding box received at step 505 a value indicating a confidence that the pixel belongs to an object. In one arrangement, a foreground confidence mask is determined at step 505 by performing foreground separation using a statistical background pixel modelling method such as Mixture of Gaussian (MoG), wherein the background model is maintained over multiple frames with a static camera.

The method 500 passes under execution of the processor 205 from step 510 to a refining step 520. At step 520, the bounding box received at step 505 is refined to tightly bound the body of the person, based on the foreground confidence mask determined at step 510. In one arrangement, the bounding box for the head region received at step 505 is converted to a full body bounding box by only including the pixels with a foreground confidence value determined at step 510 higher than a per-defined threshold and within a predetermined region of the image based on the head region. One example of a predetermined region is a region of equal width and upper boundary as the head region, and extending down to four (4) times the height of the head region. In another arrangement, the bounding box for the whole body received at step 505 is refined (by shrinking or expanding) to include the pixels with a foreground confidence value determined at the step 510 greater than a predefined threshold and within a predetermined distance from the body region. An example of a predetermined distance is a five (5) pixel margin around the bounding box.

The method 500 passes under execution of the processor 205 from step 520 to a pre-processing step 530. In execution of the pre-processing step 530, the image region inside the bounding box determined at step 520 is pre-processed for feature determination. In one arrangement, a weighting scheme is used to weight every pixel of the image region inside the bounding box determined at step 520. One example of the weighting scheme uses a 2-D Gaussian function to weight the pixels based on the spatial locations. A pixel located close to the centre of the bounding box is assigned a higher weight than a pixel located farther from the centre of the bounding box. Another example of the weighting scheme uses the foreground confidence mask determining step 510 to weight the pixels based on the foreground confidence at the corresponding location. In another arrangement, the observed object in the bounding box determined at step 520 is rectified to a vertical orientation, which reduces a variation in the visual appearance of an object due to the viewpoint of the camera. In yet another arrangement, colour normalization is applied to the image inside the bounding box determined at step 520 to compensate for lighting variations across cameras.

The method 500 passes under execution of the processor 205 from step 530 to a determining step 540. At step 540, a plurality of feature channels for the pre-processed image generated in the step 530 are determined under execution of the processor 205. At each feature channel, each pixel in the image is assigned a feature value. In one arrangement, a feature channel is the red colour value at each pixel. In another arrangement, a feature channel is the green colour value at each pixel. In another arrangement, a feature channel is the blue colour value at each pixel. In another arrangement, a feature channel is a local binary pattern (LBP) at each pixel. In another arrangement, a feature channel is an image gradient magnitude at each pixel.

The method 500 passes under execution of the processor 205 from step 540 to a determining step 550. At step 550, the appearance descriptor, also referred to as a feature vector, is determined from the feature channels determined at the step 540. The determined appearance descriptor may be stored in the memory 206 under execution of the processor 205.

In one arrangement, the appearance descriptor is determined at step 550 by dividing an image into regions and concatenating a spatial distribution of colour and texture features determined in each region. The colour feature component consists of colour histograms determined independently over a predetermined number of horizontal stripes (e.g., fifteen (15) horizontal stripes uniformly spaced from top to bottom of the image), based on the colour feature channels determined at step 540. The shape feature component is a "histogram of oriented gradients" (HOG) descriptors determined based on the image gradient feature channel determined at step 540. The texture feature component consists of histograms determined independently over predetermined regions (e.g. dividing the image according to a uniform grid), based on the LBP feature channel determined at step 540. The appearance descriptor is formed by concatenating the above components to form a single vector. In one arrangement, the descriptor is replaced with the square root of the values in the descriptor to reduce the effect of noise. In another arrangement, the appearance descriptor is determined at step 550 by encoding appearance as the difference between histograms across pairs of local regions.

In one arrangement, at step 550, the appearance descriptor is transformed by a subspace projection, in which the appearance descriptor is projected to a low-dimensional subspace. One example of a subspace projection is a Principal Component Analysis (PCA) projection. Another example of a subspace projection is a Locally-Linear Embedding (LLE).

In another arrangement, at step 550, the appearance descriptor is transformed by a nonlinear projection. In one example, a projection is obtained by performing a PCA in a reproducing kernel Hilbert space. In another example, a projection is obtained using a low rank approximation method (e.g., Nystrom approximation method). TA set of representative appearance descriptors are selected from the training dataset and then a PCA is performed on the representative appearance descriptors to obtain eigenvalues and eigenvectors. The projection of an appearance descriptor is determined using the eigenvalues and eigenvectors and the pairwise similarities between the appearance descriptor to be projected and the representative appearance descriptors.

The method 500 concludes after completing the determining step 550. An appearance descriptor is typically in the form of a vector and may also be referred to as a feature vector. The steps 510 to 550 effectively operate to determine feature vectors based on properties of pixels in the received image or sequence of images.

The method 600 of determining a dictionary, as executed at step 440 of the method 400, will now be described with reference to FIG. 6. The method 600 learns a dictionary by minimising an objective function comprised of a reconstruction error with code regulariser and manifold regulariser. Denote as $X_Q = \{x_Q(i)\}_{i=1}^{N}$ and $X_G = \{x_G(i)\}_{i=1}^{N}$ the N appearance descriptors of the objects from the query camera and N appearance descriptors of the objects from the gallery camera, respectively, as determined at step 430 of method 400. The objective function is described in accordance with Equation (3), as follows:

$$\min_{D,A} \|X-DA\|_F^2 + \lambda R_C(A) + \beta R_M(A) \quad (3)$$

where $\|\cdot\|_F$ denotes the Frobenius norm of a matrix, $D=[d(1), \ldots, d(K)]$ represents the dictionary comprised of K dictionary atoms, $X=[X_Q, X_G]$ represents input data comprised of 2N appearance descriptors extracted from training images, $A=[a(1), \ldots, a(2N)]$ represents 2N codes for corresponding appearance descriptors based on the dictionary D, and $R_C(A)$ and $R_M(A)$ represent the code regulariser and manifold regulariser, respectively. The regularisation factors $\lambda$ and $\beta$ control the balance between the reconstruction error and the regularisers. In one arrangement, the code regulariser $R_C(A)=\Sigma_{i=1}^{2N}\|a(i)\|_1$ measures the sparsity of a code a(i) using $1_1$-norm. In another arrangement, the code regulariser $R_C(A)=\Sigma_{i=1}^{N}\|a(i)\|_2^2$ measures the magnitude of a code a(i) using $l_2$-norm. If the trace of a matrix B is defined as trace(B), the manifold regulariser $R_M(A)$ in one arrangement is $R_M(A)=\text{trace}(ALA^T)$, which makes the atoms of the dictionary respect the neighbouring relationship underlying the input data using the Laplacian matrix L. If two appearance descriptors x(i) and x(j) are close to each other in the feature space, then the corresponding codes a(i) and a(j) are also close to each other in the encoding space.

The method 600 may be implemented within the module 201 as one or more software code modules of the software application program 233 resident in the hard disk drive 210 and being controlled by execution of the processor 205.

The method 600 starts at a receiving step 605, where appearance descriptors determined from training images are received as input under execution of the processor 205.

The method 600 passes under execution of the processor 205 from step 605 to a determining step 610. At step 610, an assignment between objects in training images received from query and gallery cameras is determined using appearance descriptors under execution of the processor 205. In one arrangement, the assignment is determined by using the Hungarian assignment algorithm that solves the assignment problem based on a cost matrix. Each element of the cost matrix is the dissimilarity between two appearance descriptors extracted respectively from two objects. One object is detected from a training image received from the query camera 125 and the other object is detected from a training image received from the gallery camera 115. One example of a dissimilarity measure is a Euclidean distance between appearance descriptors. Another example of a dissimilarity measure is a Cosine distance between appearance descriptors. Any other suitable dissimilarity measure may be used to determine the dissimilarity between appearance descriptors. In another arrangement, the assignment is determined by using a probabilistic graph matching algorithm that solves the assignment problem using Maximum a posteriori inference.

Based on the assignment determined at step 610, each object in an image received from the gallery camera 115 is assigned as a matched object to an object in an image received from the query camera 125. The indexes of appearance descriptors in $X_Q$ and $X_G$ are re-ordered based on the assignment. The i-th appearance descriptor $x_Q(i)$ in $X_Q$ and i-th appearance descriptor $x_G(i)$ in $X_G$ are considered to be matched based on the assignment. In other words, matching descriptors in $X_Q$ and $X_G$ have the same ordinality. The output of step 610 is appearance descriptors $X_Q$ and $X_G$ re-ordered based on the assignment. The appearance descriptors $X_Q$ and $X_G$ may be stored in the memory 206.

The method 600 progresses under execution of the processor 205 from step 610 to a generation and refinement step 615. At the step 615, an affinity matrix is generated using appearance descriptors $X_Q$ and $X_G$ re-ordered at step 610. Each element of the affinity matrix, $W_{i,j}$, is the similarity score between the i-th appearance descriptor $x_Q(i)$ in $X_Q$ and the j-th appearance descriptor $x_G(j)$ in $X_G$. Each diagonal element of the affinity matrix W is the similarity score between the i-th appearance descriptor $x_Q(i)$ in $X_Q$ and the i-th appearance descriptor $x_G(i)$ in $X_G$, which is considered as a match to $x_Q(i)$ based on the assignment determined at step 610. One example of a similarity score used for generating the affinity matrix is a reciprocal Euclidean distance between appearance descriptors. Another example of a similarity score is a Gaussian kernel value between appearance descriptors. Any other suitable similarity score may be used to determine the similarity between appearance descriptors. The affinity matrix is then refined using a diffusion process that iteratively improves the affinity matrix by exploring the underlying characteristic of the data based on the pairwise similarities in the affinity matrix. In one arrangement, a smoothing operator is determined as $P=C^{-1}W$ where C is a degree matrix with diagonal elements $C_{i,i}$ determined in accordance with Equation (4) as follows:

$$C_{i,i}=\Sigma_j W_{i,j} \qquad (4)$$

where $W_{i,j}$ is the element of the affinity matrix W at the i-th row and j-th column. The affinity matrix is iteratively updated by using the smoothing operator P as follows:

$$W(t+1)=W(t)P+1$$

where W(t) represents the affinity matrix obtained at the t-th iteration. After being iteratively updated by the smoothing operator for a selected number of iterations (e.g., 10), the affinity matrix is normalized as $W=WC^1$. In another arrangement, the smoothing operator P is constructed by taking n (e.g., n=5) largest entries at each row of the affinity matrix. The remaining entries at each row of the smoothing operator are set to zero. The affinity matrix is then iteratively updated by using the smoothing operator P as follows:

$$W(t+1)=PW(t)P^T+1$$

The refined affinity matrix output at step 615 may be stored in the memory 206.

The method 600 passes under execution of the processor 205 from step 615 to a determining step 620. At step 620, a Laplacian matrix L is determined using the affinity matrix W generated at step 615 in accordance with Equation (5), as follows:

$$L=C-W \qquad (5)$$

where C is the degree matrix with diagonal elements $C_{i,i}$ determined from the affinity matrix W in accordance with Equation (4). Some entries of the Laplacian matrix L are then assigned to be zero by comparing each entry to a pre-defined threshold (e.g., 0.4). The Laplacian matrix L output at step 620 may be stored in the memory 206.

The method 600 passes under execution of the processor 205 from step 620 to an initialization step 625, wherein the dictionary and the model parameters for dictionary learning are initialized. In one arrangement, the dictionary is initialised by a random matrix where each element is a random number generated according to a predetermined distribution (e.g. a Gaussian distribution). In another arrangement, the dictionary is initialised by using a K-SVD algorithm. In one arrangement, the initial values of the model parameters K, $\lambda$, and $\beta$ in Equation (3) may be predetermined (e.g., K=128, $\lambda$=0.01 and $\beta$=1.0). In another arrangement, the initial values of the model parameters K, $\lambda$, and $\beta$ are determined by using cross-validation. The initial dictionary and model parameters output at step 625 may be stored in the memory 206.

The method 600 passes under execution of the processor 205 from step 625 to a learning step 630, where the dictionary is learned using the appearance descriptors re-ordered at step 610, the Laplacian matrix determined at step 620, and the dictionary and model parameters initialized at step 625. A method 700 of learning the dictionary, as executed at step 630, will be described hereinafter with reference to FIG. 7. The dictionary output at step 630 may be stored in the memory 206.

The method 600 progresses under execution of the processor 205 from step 630 to a determining step 635, wherein the codes for the appearance descriptors are determined based on the dictionary determined at step 630. At step 635, the code for each appearance descriptor is determined in a similar manner to step 350 and step 355 of method 300 in FIG. 3 that determine codes for query and gallery objects respectively. The determined codes may be stored in the memory 206.

The method 600 passes under execution of the processor 205 from step 635 to a decision step 640, where the maximum number of iterations is checked. The maximum number of iterations is pre-defined to be an integer larger than zero. At step 640, if the maximum number of iterations has been reached, Yes, then the method 600 concludes after completing the decision step 640 and the output of the method 600 is the learned dictionary. If the maximum number of iterations has not been reached, No, then the method 600 proceeds from the decision step 640 to a determination step 645.

At step 645, an assignment between the codes received from step 635 is determined in a similar manner to step 610.

The indexes of the appearance descriptors in $X_Q$ and $X_G$ and the indexes of codes for the appearance descriptors are re-ordered based on the assignment determined at step 645. The appearance descriptors and codes output at step 645 may be stored in the memory 206.

The method 600 passes under execution of the processor 205 from step 645 to a generation and refinement step 650, where an affinity matrix is generated using the codes re-ordered at step 645. At step 650, the affinity matrix is generated and is refined using a diffusion process in a similar manner to step 615.

The method 600 passes under execution of the processor 205 from step 650 to a determination step 660, wherein a Laplacian matrix L is determined using the affinity matrix determined at step 650. The Laplacian matrix L is determined in a similar manner to step 620. The Laplacian matrix L output at step 660 may be stored in the memory 206.

The method 600 passes under execution of the processor 205 from step 660 to a learning step 665, where the dictionary is learned using the appearance descriptors re-ordered at step 645, the Laplacian matrix determined at step 660, the model parameters initialized at step 625, and the dictionary learned at step 630. A method 700 of learning the dictionary, as executed at step 665, will be described hereinafter with reference to FIG. 7.

The method 600 returns under execution of the processor 205 from the learning step 665 to the determination step 635.

Figure 7:
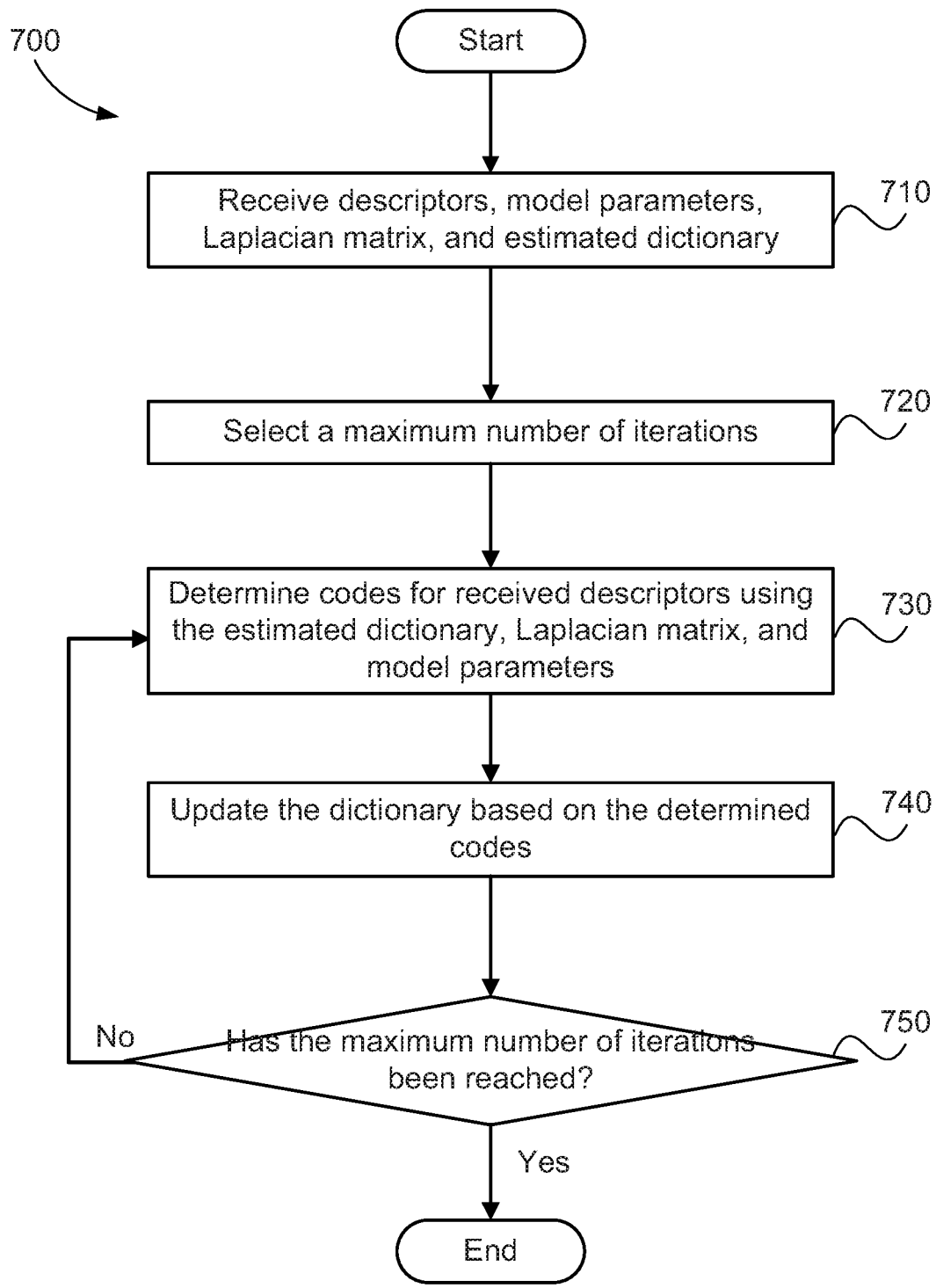
FIG. 7 is a schematic flow diagram of a method of learning a dictionary as used in the method of FIG. 6.

The method 700 of learning a dictionary, as executed at the steps 630 and 665 of the method 600, is now described with reference to FIG. 7. The method 700 may be implemented within the module 201 as one or more software code modules of the software application program 233 resident in the hard disk drive 210 and being controlled by execution of the processor 205.

The method 700 starts at a receiving step 710, where appearance descriptors, a Laplacian matrix, the model parameters initialized at step 625, and an estimated dictionary are received as input under execution of the processor 205. The estimated dictionary is the dictionary initialized at step 625, or the dictionary output from the previous learning process at step 665 of method 600.

The method 700 passes under execution of the processor 205 from step 710 to a selection step 720, where a maximum number of iterations is selected. In one arrangement, the maximum number of iteration is selected to be twenty (20). The maximum number of iterations output at step 720 may be stored in the memory 206.

The method 700 passes under execution of the processor 205 from step 720 to a determination step 730. At step 730, the codes for the received descriptors are determined using the estimated dictionary, Laplacian matrix L, and model parameters received from the step 710. The codes are determined by minimizing the objective function described in accordance with Equation (6), as follows:

$$\min_A \|X-DA\|_F^2 + \lambda R_c(A) + \beta \text{trace}(ALA^T) \quad (6)$$

where D represents the estimated dictionary. The determination of the codes is based on the selection of the code regulariser $R_c(A)$.

In one arrangement, the code regulariser $R_C(A) = \Sigma_{i=1}^{2N} \|a(i)\|_1$ is selected to measure the sparsity of a code $a(i)$ using $l_1$-norm. In the arrangement where the code regulariser $R_C(A) = \Sigma_{i=1}^{2N} \|a(i)\|_1$ is selected to measure the sparsity of a code $a(i)$ using $l_1$-norm, the codes are determined by using a sparse coding algorithm. One example of a sparse coding algorithm is a feature-sign search algorithm. Another example of a sparse coding algorithm is an alternating direction method of multipliers.

In another arrangement, the code regulariser $R_C(A) = \Sigma_{i=1}^{N} \|a(i)\|_2^2$ is selected to measure the magnitude of a code $a(i)$ using $l_2$-norm. In the arrangement where the code regulariser $R_C(A) = \Sigma_{i=1}^{N} \|a(i)\|_2^2$ is selected to measure the magnitude of a code $a(i)$ using $l_2$-norm, the codes A are determined by solving a Sylvester equation described in accordance with Equation (7), as follows:

$$(D^T D + \lambda I)A + \beta AL = D^T X \quad (7)$$

The codes output at step 730 may be stored in the memory 206.

The method 700 passes under execution of the processor 205 from step 730 to an updating step 740. At step 740, the dictionary is updated using the codes determined at step 730. In one arrangement, the dictionary D is updated in accordance with Equation (8), as follows:

$$D = XA^T(AA^T + \mu I)^{-1} \quad (8)$$

where $\mu$ is a predefined regularisation factor (e.g., $\mu = 0.01$). In another arrangement, the dictionary is updated using a gradient descent method.

The method 700 passes under execution of the processor 205 from step 740 to a decision step 750, where the maximum number of iterations selected at step 720 is checked. At step 750, if the maximum number of iterations has been reached, Yes, then the method 700 concludes after completing the decision step 750 and the output of the method 700 is the learned dictionary. If the maximum number of iterations has not been reached, No, then the method 700 proceeds from the decision step 750 to a determination step 730.

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

The invention claimed is:

1. A method for comparing objects in images captured by different cameras, the method comprising:
   receiving a dictionary determined from a plurality of feature vectors, formed from a test image of an object, and codes, formed by applying the dictionary to the plurality of feature vectors, wherein the dictionary is based on a modified manifold obtained by determining correspondences for codes using pairwise similarities between codes in an encoding space;
   determining, by applying the dictionary to feature vectors of the objects in the images, comparison codes for the objects in the images captured by the different cameras; and
   comparing the objects in the images based on the determined comparison codes of the objects.

2. The method according to claim 1, further comprising:
   refining the modified manifold based on local connectivity of codes; and
   determining the dictionary using the codes and the refined manifold.

3. The method according to claim 1, further comprising:
   generating an affinity matrix using the comparison codes;
   determining a Laplacian matrix from the affinity matrix using diffusion; and determining the dictionary using the plurality of feature vectors and the Laplacian matrix.

4. The method according to claim 1, further comprising determining a plurality of feature channels for one or more of the images.

5. The method according to claim 1, further comprising determining the dictionary based on a minimized objective function comprised of a reconstruction error.

6. The method according to claim 1, further comprising determining a similarity score between the codes.

7. The method according to claim 6, wherein the similarity score is a Cosine distance between the codes.

8. The method according to claim 6, further comprising comparing the similarity score to a fixed threshold.

9. The method according to claim 6, further comprising comparing the similarity score to a further similarity score for a query object and all other objects in a video stream.

10. The method according to claim 1, further comprising determining a dissimilarity score between the codes.

11. The method according to claim 10, wherein the dissimilarity score is a Euclidean distance between the codes.

12. The method according to claim 1, wherein the plurality of feature vectors are based on properties of pixels in the test image.

13. An apparatus for comparing objects in images captured by different cameras, the apparatus comprising:
one or more processors; and
memory storing instructions that, when executed by the one or more processors, cause the apparatus to perform operations including:
receiving a dictionary determined from a plurality of feature vectors formed from a test image of an object, and codes, formed by applying the dictionary to the plurality of feature vectors, wherein the dictionary is based on a modified manifold obtained by determining correspondences for codes using pairwise similarities between codes in an encoding space,
determining, by applying the dictionary to feature vectors of the objects in the images, comparison codes for the objects in the images captured by the different cameras, and
comparing the objects in the images based on the determined comparison codes of the objects.

14. A non-transitory computer readable medium storing a computer program to cause an apparatus to perform a method for comparing objects in images captured by different cameras, the method comprising:
receiving a dictionary determined from a plurality of feature vectors, formed from a test image of an object, and codes, formed by applying the dictionary to the plurality of feature vectors, wherein the dictionary is based on a modified manifold obtained by determining correspondences for codes using pairwise similarities between codes in an encoding space;
determining, by applying the dictionary to feature vectors of the objects in the images, comparison codes for the objects in the images captured by the different cameras; and
comparing the objects in the images based on the determined comparison codes of the objects.

15. The method according to claim 1, wherein the modified manifold is obtained by determining the correspondences so that matching feature vectors have the same ordinality to generate an affinity matrix indicating a reciprocal Euclidean distance between feature vectors, and by refining the affinity matrix using a diffusion process.

* * * * *